March 31, 1936. K. SCHULTZ 2,035,673
SPRAY DRYING APPARATUS
Filed May 7, 1934 2 Sheets-Sheet 1

Inventor:
Kristian Schultz,

March 31, 1936.　　　　K. SCHULTZ　　　　2,035,673
SPRAY DRYING APPARATUS
Filed May 7, 1934　　　2 Sheets-Sheet 2
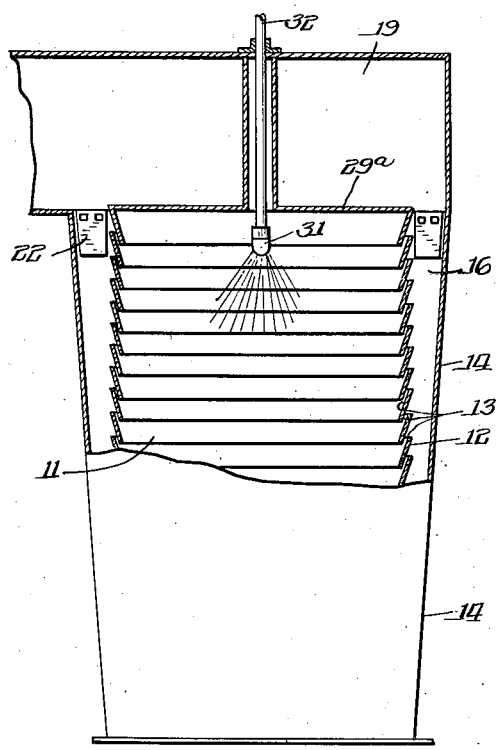
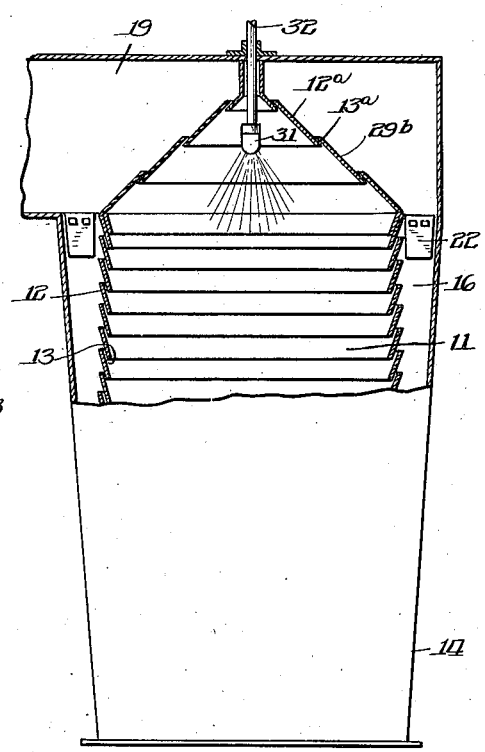
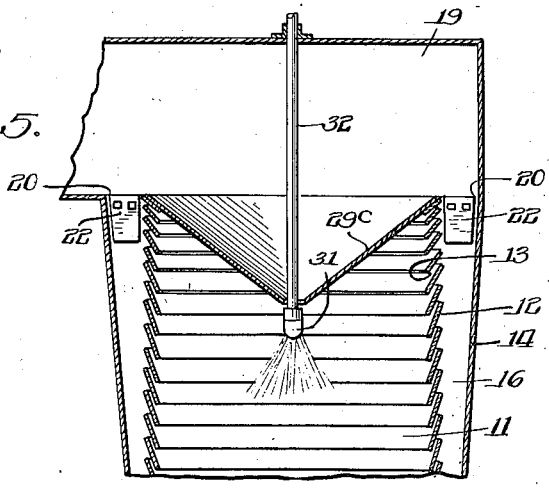
Inventor:
Kristian Schultz,
By Cromwell Greist & Warden
attys Patented Mar. 31, 1936

2,035,673

UNITED STATES PATENT OFFICE 2,035,673

SPRAY DRYING APPARATUS

Kristian Schultz, Chicago, Ill., assignor to Armour and Company, Chicago, Ill., a corporation of Illinois Application May 7, 1934, Serial No. 724,338

10 Claims. (Cl. 159—4).

The present invention pertains to apparatus for evaporating solid-containing liquids or liquid-containing solids, of which milk and eggs are typical, to varying degrees of dryness.

The principal objects of the invention are the provision of apparatus of large and efficient capacity in a form requiring relatively small space for installation and operation; the embodiment in such apparatus of means for the regulation of the quantity, temperature and humidity of the treating gas such as air, and of the period of time during which the material is subject to treatment; control of flow of the treating gas whereby most efficiently to prevent adherence to the walls of the treating chamber, avoiding dead areas and eddy currents within the drying chamber, and equalization of the treatment of all portions of the material as predetermined in respect of time, temperature and ultimate dryness of the product.

To facilitate an understanding of the invention, preferred and modified embodiments of the same are hereinafter described in connection with the accompanying drawings, wherein Fig. 1 is a side elevation partly in vertical section of an apparatus embodying the invention;

Fig. 3 is a partial vertical section through a slightly modified form of the apparatus;

Fig. 4 is a similar view illustrating another modification; and

Fig. 5 is a similar view of still another.

Further modifications may be made in structure without departure from the essence of the invention, wherefore it will be understood that the preferred structure and modifications thereof are set forth by way of illustration rather than as limiting the scope of the invention other than as required by the prior art.

Figure 1:
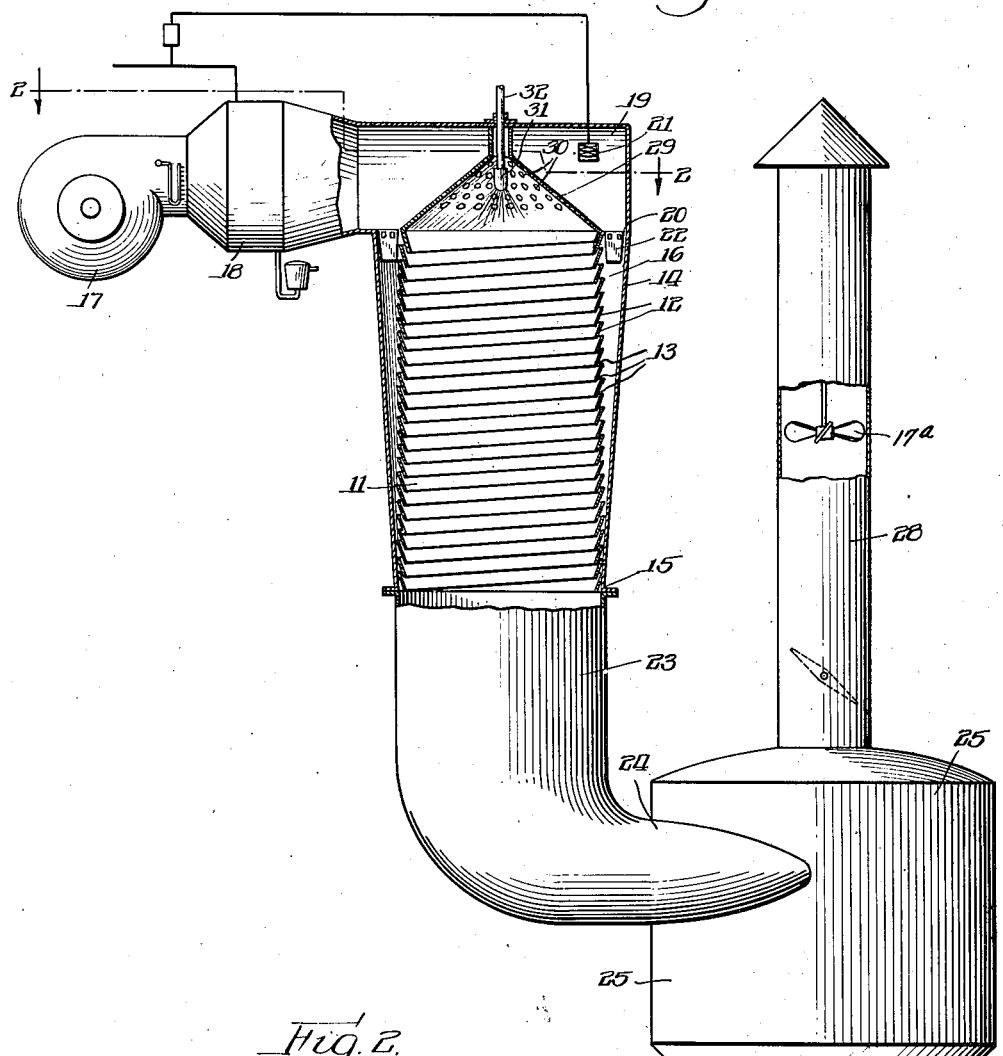
Figure 2:
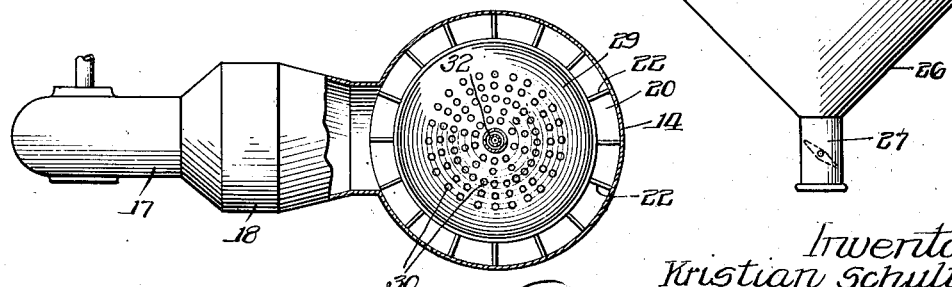
Fig. 2 is a horizontal section on the irregular line 2—2 of Fig. 1.

Having reference to Fig. 1, it will be observed that the apparatus comprises a drying chamber 11 having walls formed by louvers 12 disposed in slightly overlapping relation to present therebetween cylindrical substantially parallel openings 13 from the exterior to the interior of the drying chamber. These louvers may, as shown, be arranged at a slight inclination to the horizontal in a continuous spiral formation whereby the openings 13, while in substantially horizontal parallel planes, will have a spiral relation to the axis of the drying chamber.

The imperforate outer wall 14 surrounding and in spaced relation to the drying chamber are preferably slightly conical, contracting downwardly to the point 15 where they contact the louver wall of the drying chamber thus providing an interspace 16 between the outer wall and the inner wall, which interspace gradually decreases in area from the top to the bottom. This interspace serves as a distributing chamber for the treating gas.

A blower indicated at 17 supplies a treating gas, ordinarily air, under pressure to the heating element 18 and thence to the manifold chamber 19 from which the gas enters the distributing space 16 through an annular opening 20 about the upper end of the drying chamber.

The gas pressure is controlled by the regulation of the blower 17 and its temperature by heating elements under control of a thermostatic device indicated at 21.

The annular opening 20 from the manifold chamber 19 to the distributing space 16 is fitted with pendant hinged vanes 22 which may be adjusted relative to the vertical whereby to permit the treating gas to enter the distributing space in a vertical direction or at an inclination to the vertical, in which latter case the gas within the distributing space is given a whirling direction of travel.

Below the drying chamber the casing 23 extends downwardly as a continuation of the wall 14 and laterally at 24 where it enters a conventional cyclone collector 25 provided with the hopper-like lower portion 26 whence it falls through the valved neck 27 into any suitable depository. The dust-freed treating gas is discharged from the collector 25 through the valved stack 28.

The particular type of dust collector employed is immaterial.

Obviously, instead of or in addition to employing a blower as 17 to force the treating gas under pressure through the system, an exhaust blower 17a may be installed in the stack 28 or at another suitable point whereby to draw the treating gas from the heater through the drying chamber and the collector chamber.

At the upper end of the drying chamber there may be positioned an upwardly convex cone 29 projecting into the manifold chamber 19 for equalizing the amount of gas entering the annular distributing space 16. This conical cover 29, forming a closure at the upper end of the drying chamber may advantageously be provided with a number of small apertures 30 through which a modicum of gas will pass whereby to avoid any dead air space, back-lash or eddy currents beneath the same. Such amount of treating gas as enters through the cover is precisely the same in all respects as that which enters the drying chamber through the louver openings and corresponds thereto in temperature and pressure. There is no primary and secondary gas, all being identical and supplied from the same source.

At the apex of this cone is disposed a spraying device here shown as a nozzle 31 which is supplied with the material to be evaporated through the pipe 32.

As the material is discharged as a fine spray from the nozzle 31 in a downward and outward direction toward the wall 12, it is met by the continuous approximately annular spiral sheets of gas entering through the louver opening 13 and prevented from coming into physical contact with the wall, while the gas entering through the openings 30 surrounds the spray within the coned cover and as it descends, mingles with the gas currents entering through the louver openings to effect thorough commingling of the treating gas in the central portion of the drying chamber. The spiral direction imparted to the treating gas in the distributing chamber 16 by the vanes 22, supplemented by spiral arrangement of the louver openings, has the effect of creating a whirlpool or vortex within the drying chamber whereby the material being evaporated is thoroughly agitated and at the same time directed towards the axis of the chamber. None of the material can come in contact with the side walls, thus avoiding any possibility of adhesion thereto. The downwardly directed annular curtain of gas just inside the walls of the casing serve to insulate the walls from the material and to virtually form a barrier against the progress of the material outwardly beyond this annular curtain.

The modification shown in Fig. 3 differs from that previously described only in the comformation of the cover member of the upper end of the drying chamber. Herein it is shown as being a flat plate 29a and the formation of eddy currents thereunder is minimized by the location of the spray nozzle 31 in substantially the same plane as the uppermost louver opening.

In Fig. 4 a conical cover member 29b is shown as employed somewhat similar to that of Fig. 1. Here, however, the cone is made up of louvers 12a and the treating gas is introduced through annular louver openings 13a whereby annular sheets of gas insulate the inner wall of the cone from the sprayed material and also preclude the formation of any dead space or eddy currents.

In Fig. 5 is shown a cover member 29*c* downwardly coned with the nozzle 31 disposed at the apex of the cone. Here the inner wall of the cone is swept by the sheets of gas entering through the louver openings 13 between the louvers 12 which latter may have their inclination to the vertical slightly modified in that area surrounding the cone whereby the incoming sheets of gas will impinge against and sweep the inner wall of the cone.

It is to be understood that directional terms as used herein, such as vertical, horizontal, downward, upward, above, below and the like, have application only to relative arrangement as shown in the drawings.

I claim:

1. Evaporating apparatus comprising a drying chamber having walls provided with openings thereto longitudinally spaced and extending substantially parallel to each other, an outer enclosing wall spaced from the said chamber to provide an annular gas distributing space, means to supply treating gas to said distributing space, adjustable means to control the direction of flow within said distributing space, and means to introduce the material to be treated in finely divided condition axially of the drying chamber.

2. Evaporating apparatus comprising a drying chamber having walls provided with openings thereto longitudinally spaced and extending substantially parallel to each other, an outer enclosing wall spaced from the said chamber to provide an annular gas distributing space, means to supply treating gas to said distributing space, adjustable means to control the direction of flow within said distributing space, means to introduce the material to be treated in finely divided condition axially of the drying chamber, and means to condition said gas as to temperature, pressure, and quantity.

3. Evaporating apparatus comprising a vertically disposed drying chamber of generally cylindrical shape having walls provided with louver openings thereto longitudinally spaced apart and extending substantially parallel to each other, an outer enclosing wall at an inclination to and spaced from the said chamber to provide an annular downwardly reduced gas distributing space, means to supply treating gas downwardly to said distributing space, means to condition said gas, means to introduce the material to be treated in finely divided condition axially of the chamber before reaching the first louver openings, and means to withdraw the gas and dried material from the drying chamber.

4. Evaporating apparatus comprising an upright drying chamber of generally cylindrical shape having walls provided with louver openings thereinto longitudinally spaced apart and extending substantially parallel to each other with interspaces directed longitudinally of the chamber, an outer enclosing wall spaced from the said chamber at an inclination to provide an annular gas distributing space of reduced area downwardly, means to supply treating gas to the drying chamber by way of the distributing space and the louver interspaces, said means comprising a blower, a distributing manifold, and an annular inlet from the manifold to the distributing space, a cover separating the drying chamber from the manifold, means to introduce the material to be treated in finely divided condition into the drying chamber axially thereof and in the same general direction as the incoming treating gas, and means to separate the treating gas and dried material upon its exit from the drying chamber.

5. Evaporating apparatus comprising a drying chamber of generally cylindrical shape having walls provided with louver openings thereinto longitudinally spaced apart and extending spirally substantially parallel to each other, an outer enclosing wall spaced from the said chamber to provide an annular gas distributing space, means to supply treating gas to the drying chamber by way of the distributing space, said means comprising a blower, a distributing manifold, and an annular inlet from the manifold to the distributing space with directing vanes adjustably disposed in the annular inlet, a cover separating the drying chamber from the manifold but providing for the introduction therethrough of small quantities of gas, means to condition the gas before its entry into the manifold as to temperature, pressure, and quantity, means to introduce the material to be treated in finely divided condition into the drying chamber axially of the cover, and means to separate the treating gas and dried material upon its exit from the drying chamber.

6. Evaporating apparatus comprising a drying chamber of generally cylindrical shape having walls provided with openings longitudinally spaced apart, an outer enclosing wall spaced from the chamber to provide an annular gas distributing space, means to supply treating gas to the distributing space in a downward direction, means to impart to the gas in the distributing space prior to its entry into the drying chamber a spiral directional flow, said means comprising a series of directing vanes adjustable to varying angles and disposed at the entrance to the distributing space.

7. Evaporating apparatus comprising a drying chamber having walls provided with openings thereto longitudinally spaced and extending substantially parallel to each other, an outer enclosing wall spaced from the said chamber more widely above than below to provide an annular downwardly extending gas distributing space of gradually reduced area, means to supply treating gas downwardly to said distributing space, means to direct and control the flow of the gas within said distributing space and drying chamber, the openings connecting the outer distributing space with the inner treating chamber arranged to direct the treating gas downwardly along the inside of the chamber walls, and means to introduce the material to be treated in finely divided condition axially of the drying chamber.

8. Evaporating apparatus comprising a drying chamber having walls provided with openings thereto longitudinally spaced and extending substantially parallel to each other, an outer enclosing wall spaced from the said chamber to provide an annular gas distributing space of gradually diminishing capacity longitudinally, means to supply treating gas to said distributing space at the portion of greater capacity, adjustable means to control the direction of flow within said distributing space, and means to introduce the material to be treated in finely divided condition axially of the drying chamber.

9. Evaporating apparatus comprising a drying chamber of generally cylindrical shape having walls provided with openings longitudinally spaced apart, an outer enclosing wall spaced from the chamber to provide an annular gas distributing space of progressively reduced capacity, means to supply treating gas to the distributing space at that portion of greater capacity, means to impart to the gas in the distributing space prior to its entry into the drying chamber a spiral directional flow, said means comprising a series of directing vanes adjustable to varying angles and disposed at the entrance to the distributing space.

10. Evaporating apparatus comprising a drying chamber having walls provided with openings thereto longitudinally spaced and extending substantially parallel to each other, an outer enclosing wall spaced from the said chamber more widely adjacent its inlet to provide an annular gas distributing space of gradually reduced area, means to supply treating gas to the greater area of said distributing space, means to direct and control the flow of the gas within said distributing space and drying chamber, the openings connecting the outer distributing space with the inner treating chamber arranged to direct the treating gas along the inside of the chamber walls, and means to introduce the material to be treated in finely divided condition axially of the drying chamber.

KRISTIAN SCHULTZ.